United States Patent
Wallach

(10) Patent No.: US 11,403,107 B2
(45) Date of Patent: Aug. 2, 2022

(54) PROTECTION AGAINST TIMING-BASED SECURITY ATTACKS BY RANDOMLY ADJUSTING REORDER BUFFER CAPACITY

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 212 days.

(21) Appl. No.: 16/210,609

(22) Filed: Dec. 5, 2018

(65) Prior Publication Data

US 2020/0183699 A1    Jun. 11, 2020

(51) Int. Cl.
| | | |
|---|---|---|
| *G06F 21/71* | (2013.01) | |
| *G06F 9/50* | (2006.01) | |
| *G06F 9/30* | (2018.01) | |
| *G06F 9/38* | (2018.01) | |

(52) U.S. Cl.
CPC .............. *G06F 9/3855* (2013.01); *G06F 9/50* (2013.01); *G06F 21/71* (2013.01)

(58) Field of Classification Search
CPC .......... G06F 9/3855; G06F 9/50; G06F 21/71; G06F 21/00
See application file for complete search history.

(56) References Cited

U.S. PATENT DOCUMENTS

| | | | | |
|---|---|---|---|---|
| 5,727,177 A | * | 3/1998 | McMinn | G06F 9/3001 712/217 |
| 6,757,831 B1 | | 6/2004 | Folmsbee | |
| 2006/0090161 A1 | * | 4/2006 | Bodas | G06F 9/5044 718/100 |
| 2008/0133629 A1 | | 6/2008 | Stribaek et al. | |
| 2010/0011198 A1 | * | 1/2010 | Hooker | G06F 9/3855 713/1 |
| 2010/0107166 A1 | * | 4/2010 | Topaloglu | G06F 9/5094 718/102 |
| 2011/0225654 A1 | | 9/2011 | Weng et al. | |
| 2014/0025960 A1 | | 1/2014 | McLean | |
| 2016/0171252 A1 | | 6/2016 | Leiserson et al. | |
| 2020/0034929 A1 | * | 1/2020 | Rao | G06F 9/4881 |

OTHER PUBLICATIONS

Hardware random number generator, Wikipedia, printed on Nov. 19, 2018.
Instruction window, Wikipedia, printed on Nov. 19, 2018.
Out-of-order execution, Wikipedia, printed on Nov. 12, 2018.

(Continued)

*Primary Examiner* — David J. Huisman
(74) *Attorney, Agent, or Firm* — Greenberg Traurig

(57) ABSTRACT

Methods, systems, and apparatuses related to re-order buffers and for protection from timing-based security attacks are described. A processor may have functional units configured to execute instructions out of order, a re-order buffer configured to buffer the execution results of instructions for output in order, and a controller configured to randomize data timing in the re-order buffer. For example, the controller can make random adjustments to the capacity of the re-order buffer in buffering and/or sorting execution results and thus randomize data timing in the re-order buffer.

13 Claims, 4 Drawing Sheets

(56) References Cited

OTHER PUBLICATIONS

Re-order buffer, Wikipedia, printed on Nov. 12, 2018.
Reorder Buffer, ECEN 6253, Advanced Digital Computer Design, Mar. 10, 2003.
Sequential consistency, Wikipedia, printed on Nov. 19, 2018.
Timing attack, Wikipedia, printed on Nov. 19, 2018.
Tomasulo algorithm, Wikipedia, printed on Nov. 12, 2018.
International Search Report and Written Opinion, PCT/US2019/063991. dated Mar. 24, 2020, 8 pages.

* cited by examiner

US 11,403,107 B2

PROTECTION AGAINST TIMING-BASED SECURITY ATTACKS BY RANDOMLY ADJUSTING REORDER BUFFER CAPACITY

FIELD OF THE TECHNOLOGY

At least some embodiments disclosed herein relate generally to computer architecture and more specifically, but not limited to, techniques to protect against security attacks on re-order buffers.

BACKGROUND

Instructions are typically programmed to be executed sequentially. A program order of instructions is the order in which the instructions are programmed for execution in a processor.

It is possible to execute some instructions according to an alternative order and obtain the same result(s) as executing the instructions according to the program order.

Out-of-order execution have been implemented in some processors to improve the utilization of the processing power of the processors and increase the overall speed of executing a program having a sequence of instructions.

For example, when the processor is about to process an instruction that is configured to operate on an operand, the operand may be in the process of being loaded from a cache, or a main memory, or a storage device. However, the operand of the next instruction in the program order may be ready for processing in the processor. Thus, the processor may execute the next instruction, instead of pausing the execution of instructions to wait for the operand that is being loaded from the cache, the main memory, or the storage device.

A "data order" of instructions is the order in which the data or operands of the instructions become available in the processor for processing. The data order is typically different from the program order in contemporary processor design. A processor can be configured to execute instructions according to the data order of the instructions, instead of the program order of the instructions.

A re-order buffer can be used to temporally hold the execution results of instructions that are executed out of their program order. For example, the instructions can be executed in the data order of the instructions. The results stored in the re-order buffer can be moved out of the re-order buffer in the program order of the respective instructions, as if the results were generated by executing the instructions according to the program order. For example, a sequence of 3 instructions can be a first instruction to load an operand A into a first register (e.g., "load A, r1"), a second instruction to load another operand B into a second register (e.g., "load B, r2"), and a third instruction to add a number to the second register (e.g., "add #1, r2"). It is possible to execute the second instruction (e.g., "load B, r2") out of order before the execution of the first instruction (e.g., "load A, r1"), execute the third instruction (e.g., "add #1, r2"), and then execute the first instruction (e.g., "load A, r1"). Such an alternative execution sequence can be desirable when the memory system can return the operand B before the operand A. For example, when the data becomes ready in the order of B, #1, A, the instructions can be executed in the order of "load B, r2", "add #1, r2", and "load A, r1", which is different from the program order of "load A, r1", "load B, r2", and "add #1, r2".

Implementations of out-of-order execution may have security vulnerability. Examples of such security vulnerabilities in computer processors include Meltdown and Spectre that were made public in 2018. For example, security vulnerabilities may allow data to be cached from a privileged security boundary, resulting in a race condition that could be timed to leak privileged information. An example of data in a privileged security boundary is data located in the operating system kernel.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes techniques for protection against timing-based security attacks on re-order buffers.

A timing-based security attack relies upon a timing pattern of results in a re-order buffer. Such an attack can be prevented and/or made difficult to implement by randomizing the timing pattern of results in re-order buffers.

For example, the timing pattern of results in a re-order buffer can be dependent on the operating capacity of the re-order buffer. The actual/operating capacity of the re-order buffer usable to re-order results of instructions that are executed out of their program order can be changed randomly from time to time such that the timing pattern changes from time to time. Such a capacity adjustment can be performed randomly in time, or periodically, to introduce randomness in the timing of the results in the re-order buffer.

Figure 1:
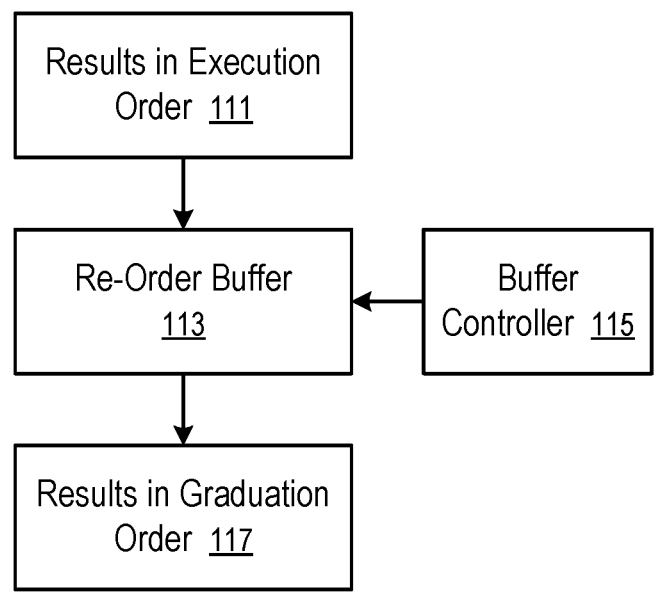
FIG. 1 shows a buffer controller configured to protect against timing-based security attacks on a re-order buffer according to one embodiment.

FIG. 1 shows a buffer controller (115) configured to protect against timing-based security attacks on a re-order buffer (113) according to one embodiment. For example, the buffer controller (115) can be implemented in a processor of a computer system illustrated in FIG. 4.

In FIG. 1, the re-order buffer (113) is configured to receive results of instructions in an order in which instructions are executed. The results in the re-order buffer (113) can be moved out of the re-order buffer (113) for committing into a register file of a processor (e.g., 181 in FIG. 4), a cache memory of the processor, and/or a memory external to the processor, based on a "graduation order." The graduation order of the results in the re-order buffer (113) for instructions is the order in which the results of the instructions are committed and the instructions are retired for completion; and the graduation order (retirement order, or commitment order) is typically configured to be consistent with the program order of the instructions. The execution result of an instruction that is to be executed early in the program order is to be graduated from the re-order buffer (113) early. A result of an instruction can be moved out of the re-order buffer (113) for committing when the results of instructions programmed before the instruction in the program order are ready to be moved out of the re-order buffer (113) for committing. In some instances, some instructions can be executed in parallel units, threads or pipelines; and the graduation order (retirement order, or commitment order) from the re-order buffer (113) preserves sequential consistency. In general, sequential consistency requires that the result of any execution is the same as if the instructions were executed in a sequential order specified by its program. Commitment or committing to a register may be referred to as writing to a register. So, results may be committed to a register by a processor configured to write the results to the register.

The capacity of the re-order buffer (113) determines the depth of a sequence of instructions that can be executed out of order before a result can graduate from the re-order buffer (113). A same set of instructions executed using re-order buffers (e.g., 113) of different capacities can have different timings of results buffering in the re-order buffer (113). Thus, changing the capacity of the re-order buffer (113) can change the pattern of out of order executions. Randomizing the change in the capacity of the re-order buffer (113) can introduce randomness in data timing in the re-order buffer (113) and thus remove the predictability of timing in the re-order buffer (113) and defeat or prevent timing-based security attacks on the re-order buffer (113).

In some instances, the re-order buffer (113) has a predetermined full capacity. The buffer controller (115) identifies a usable capacity of the re-order buffer (113) for sorting the incoming results (111) that are provided in the order of actual execution/completion of instructions. When the usable capacity identified by the buffer controller (115) is reached, the out-of-order execution of instructions beyond the set of instructions for which the re-order buffer (113) can buffer their results is prevented, until some of the results in the re-order buffer graduate from the re-order buffer (113).

The usable capacity of the re-order buffer (113) can be a random fraction of the predetermined full capacity of the re-order buffer (113). The randomness in usable capacity of the re-order buffer (113) can destroy or weaken the predictability of timing of the re-order buffer (113) and thus protect against timing-based security attack on the re-order buffer (113).

In some instances, the re-order buffer (113) can have a dynamically allocated amount of capacity for sorting the results in execution order (111) into the results in graduation order (117). The buffer controller (115) controls the dynamic allocation of the capacity for the re-order buffer (113) (e.g., based on the output of a random number generator).

In some instances, multiple processing cores can have multiple re-order buffers (e.g., 113) respectively. A buffer controller (115) can dynamically re-allocate a shared buffer capacity for the multiple re-order buffers (e.g., 113). For example, instead of evenly dividing the shared buffer capacity among the multiple re-order buffers (e.g., 113), the buffer controller (115) can randomize the ratios of capacity allocations among the multiple re-order buffers (e.g., 113) to cause randomness in timing.

In some instances, the buffer controller (115) re-configures the usable capacity of the re-order buffer (113) periodically at a regular, predetermined time interval. Alternatively, a usable capacity can be configured for the re-order buffer (113) for a random time period of operation; and after the random time period of operation, the usable capacity of the re-order buffer (113) can be reconfigured for another random period of operation. Time periods of operation may be referred to as, e.g., a first period of time and a second period of time following the first period of time. The randomness in the lengths of periods of operation at two or more constant usable capacities can also reduce or destroy the timing predictability in the re-order buffer (113).

Figure 2:
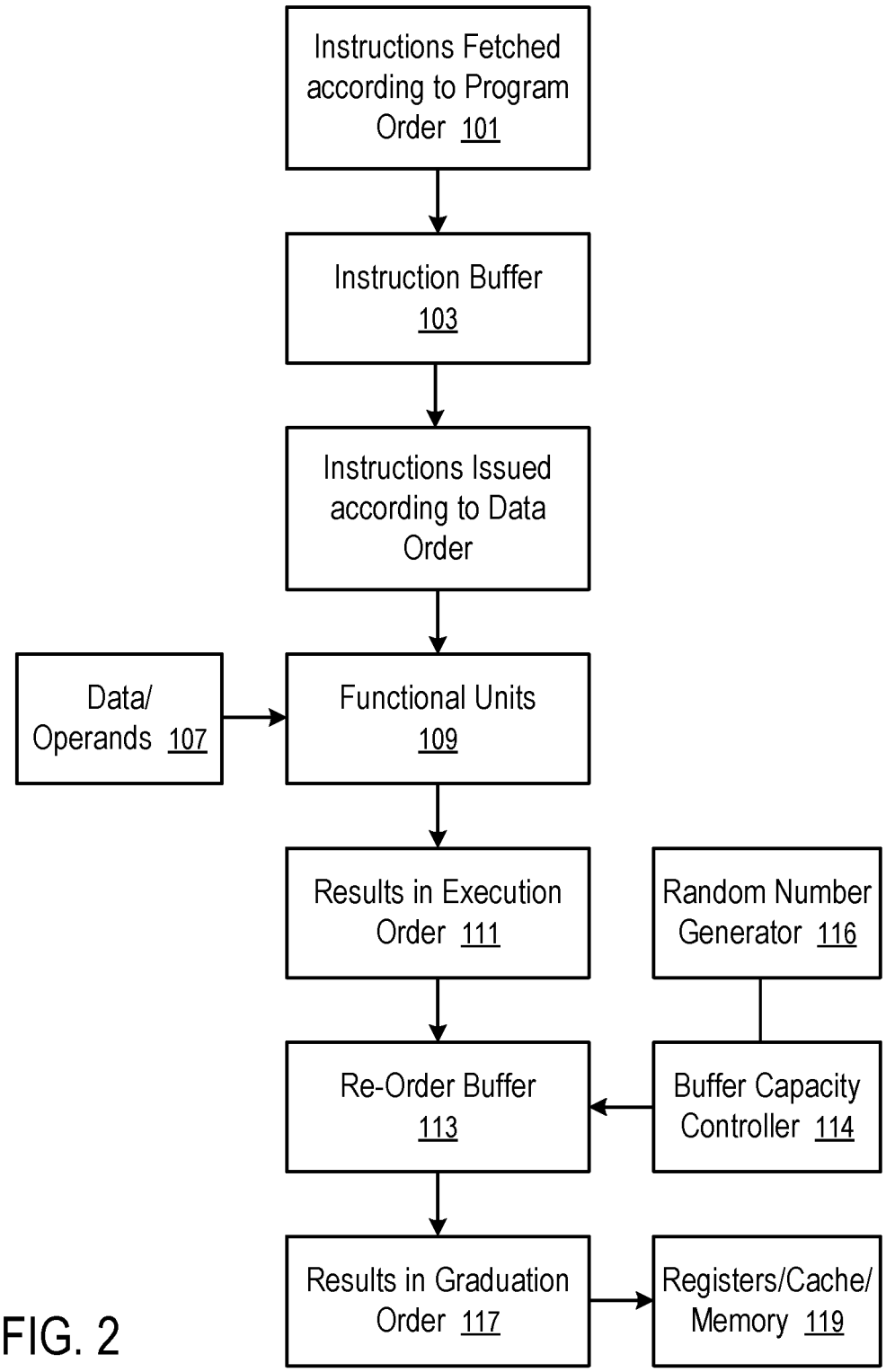
FIG. 2 shows an out-of-order execution controlled by a buffer capacity controller according to one embodiment.

FIG. 2 shows an out-of-order execution controlled by a buffer capacity controller (114) according to one embodiment. For example, the buffer controller (115) of FIG. 1 can be implemented using the buffer capacity controller (114) of FIG. 2 with a random number generator (116) to randomize out-of-order execution of instructions. The random number generator (116) can be configured to prevent an attacker from detecting the sequence of outputs generated from the random number generator (116) and/or its algorithm for generating randomized outputs. For example, statistically random noises on computer buses can be used in the random number generator (116) to prevent an attacker from accurately predicting the outputs of the random number generator (116). Electrical noises in general cannot be modeled accurately. Such stochastic processes are, in theory, completely unpredictable; and the theory's assertions of unpredictability are subject to experimental tests. In general, any techniques for securing a random number generator (116) against attacks can be used. Thus, the present disclosure is not limited to any specific implementations of random number generators.

In FIG. 2, instructions (101) fetched according to the program order of the instructions are buffered in the instruction buffer (103). The instructions (101) can be fetched from a cache memory of a processor, from a memory of a computer system, and/or a storage device of the computer system (e.g., as illustrated in FIG. 4).

The instructions in the instruction buffer (103) can be executed in functional units (109) of the processor when the data/operands (107) of the instructions are available to the functional units.

Figure 4:
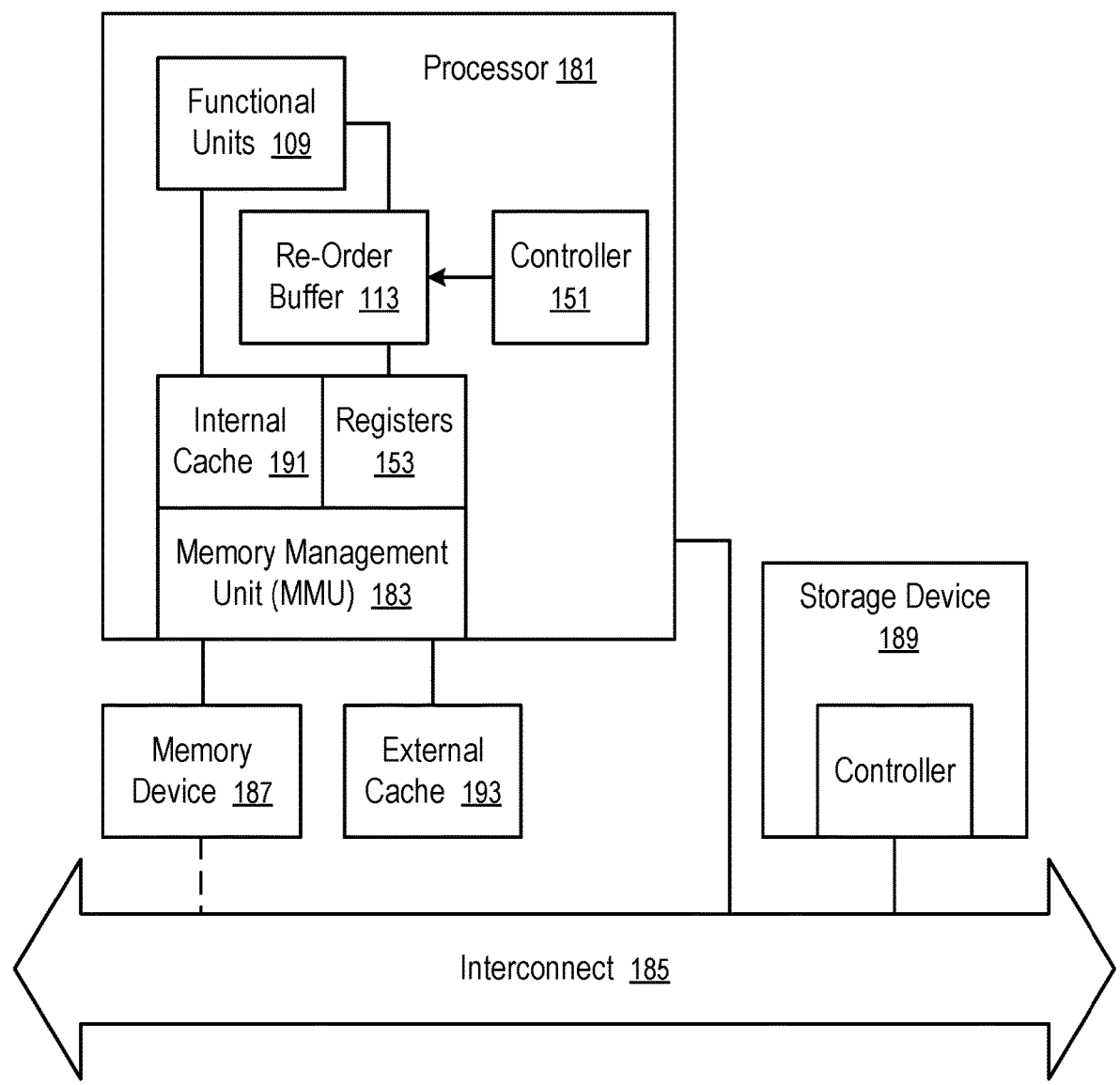
FIG. 4 show a computing system in which the method of FIG. 3 can be implemented.

In general, some of the data operands (107) of the instructions may be loaded from a cache memory of the processor, from the memory of the computer system, and/or from the storage device of the computer system (e.g., illustrated in FIG. 4). Other data operands (107) of the instructions can be the results of the executions of other instructions. Such results may be available in registers/register files of the processor and/or in the re-order buffer (113).

Loading certain data items (e.g., from a cache memory, a main memory, or a storage device) can take a time period that is longer than the processing of one or more data-ready instructions. The data/operands (107) of data-ready instructions can be used by the functional units (109) in a short time period. Thus, such data-ready instructions in the instruction buffer (103) can be issued to functional units (109) for execution according to a data order that is different from the program order.

The functional units (109) generates results (111) in an order of execution/completion of instructions; and the results (111) are temporally stored in the re-order buffer (113) for their graduation. A result of each respective instruction can graduate/retire/be committed from the re-order buffer (113) when the results of instructions before the respective instruction are in the re-order buffer (113) and ready for graduation, or have already graduated from the re-order buffer (113).

Results (117) in the graduation order, which is consistent with the program order of their instructions (101), can be moved out of the re-order buffer (113) for committing into registers (register files, a cache, a main memory, and/or a storage device) (119).

When the capacity of the re-order buffer (113) is fixed, the timing of the results (111) in the re-order buffer (113) for a given set of instructions may be predicted, determined, and/or exploited by a security attack to gain unauthorized knowledge about the execution of instructions and/or their data.

To destroy, reduce, or weaken the predictability of the timing of the results (111) entering the re-order buffer (113) and/or the results (117) leaving the re-order buffer (113), the buffer capacity controller (114) can inject randomness in the timing by randomizing the usable capacity of the re-order buffer (113) in sorting the results (111/117).

For example, the buffer capacity controller (114) can include, or be coupled to, a random number generator (116). The output of the random number generator (116) can be used in the buffer capacity controller (114) to determine a limit of usable portion of the re-order buffer (113) in sorting the results (111/117).

For example, when a result set graduates from the re-order buffer (113), the buffer capacity controller (114) can determine an adjustment to the usable portion of the re-order buffer (113) in sorting the results (111/117). The adjustment can be made via adding dummy results into the re-order buffer (113), or removing dummy results that have been previously added to the re-order buffer (113). The dummy results added into the front or the back of the queue (or another location) in the re-order buffer (113) effectively reduces the usable portion of the re-order buffer (113) for sorting the results (111/117).

For example, the output of the random number generator (116) can be converted to a count of dummy results to be kept in the re-order buffer (113) for a next time period of operations of the re-order buffer. The count of dummy results corresponds to a fraction of the full capacity of the re-order buffer (113). If the current count of dummy results in the re-order buffer (113) is larger than the desired count converted from the output of the random number generator (116), the buffer capacity controller (114) removes one or more dummy results from the re-order buffer (113), as if the dummy results were to graduate from the re-order buffer (113). If the current count of dummy results in the re-order buffer (113) is smaller than the desired count converted from the output of the random number generator (116), the buffer capacity controller (114) adds one or more dummy results to the re-order buffer (113) (e.g., in the slots vacated by the results (117) that recently graduate from the re-order buffer (113)), as if the dummy results were generated by the functional units (109) as a result of executing dummy instructions.

Alternatively, the buffer capacity controller (114) can be configured to adjust, according to the random number generator (116), one or more boundaries of the re-order buffer (113) that define the capacity of the buffer capacity controller (114).

In some instances, the output of the random number generator (116) controls when the buffer capacity controller (114) adjusts the usable capacity of the re-order buffer (113).

For example, the output of the random number generator (116) can be used to set a threshold count of cycles of operations of the re-order buffer between two successive adjustments. After the threshold count of cycles of operations following a prior adjustment, the buffer capacity controller (114) can adjust again the capacity of the re-order buffer (113).

Cycles of operations of the re-order buffer can be counted based on a predetermined number of instruction cycles (or clock cycles) of the processor in one embodiment.

Alternatively, a cycle of operations can be counted as being between two successive graduations of result sets (117) from the re-order buffer (113). In such a situation, the length of the cycle may not be a constant relative to a clock cycle and/or an instruction cycle.

Figure 3:
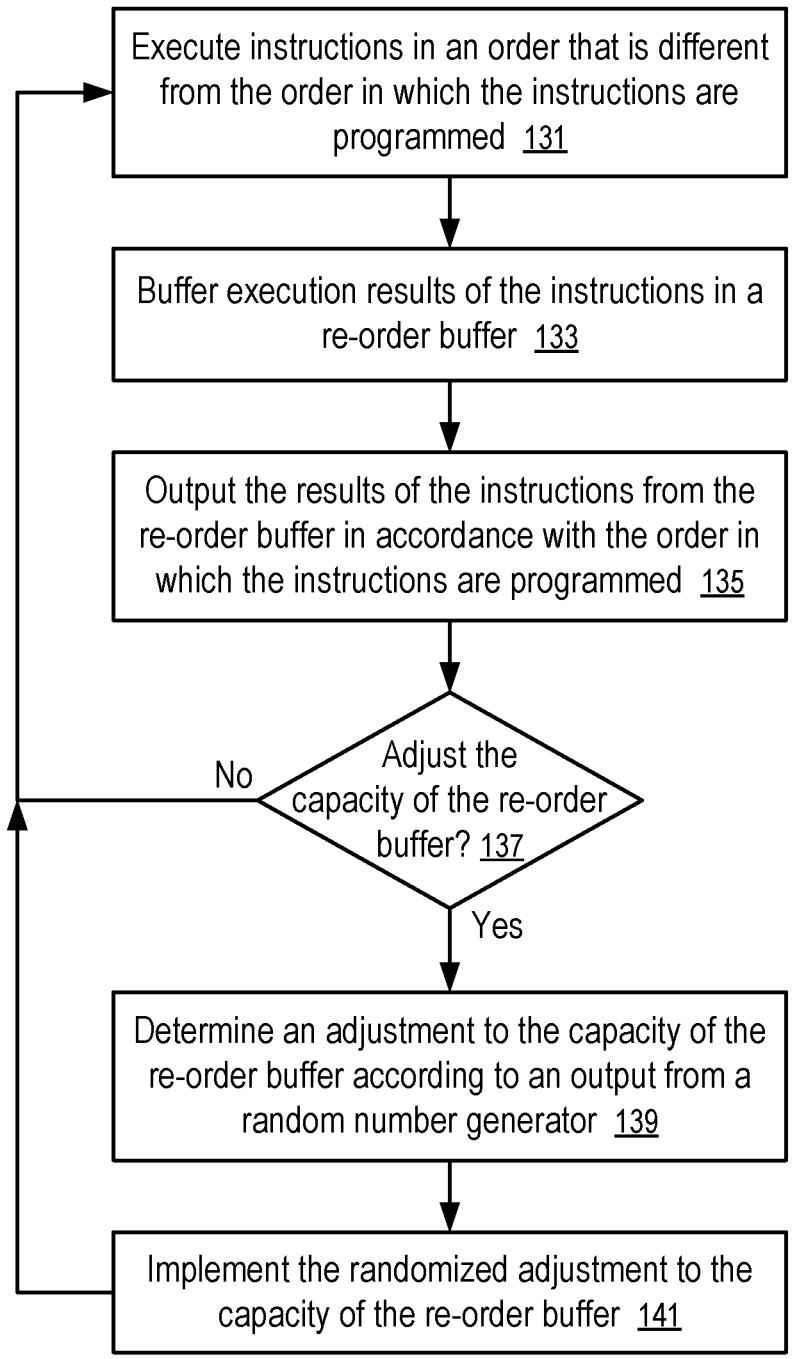
FIG. 3 shows a method to protect against timing-based security attacks on re-order buffers according to one embodiment.

FIG. 3 shows a method to protect against timing-based security attacks on re-order buffers according to one embodiment. For example, the method of FIG. 3 can be implemented using the buffer controller (115) of FIG. 1 or the buffer capacity controller (114) of FIG. 2.

At block 131, a processor (e.g., 181 in FIG. 4) executes instructions in an order that is different from a program order in which the instructions are programmed.

For example, the processor can execute the instructions according to a data order in which the data/operands of the instructions are ready in the processor for processing.

At block 133, the processor buffers execution results (111) of the instructions in a re-order buffer (113).

For example, the execution results (111) of instructions can enter the re-order buffer (113) in an order that is different from the program order of the instructions. For example, first instructions can be programmed to be processed earlier than second instructions; due to out-of-order execution, execution results of the second instructions can arrive in the re-order buffer (113) earlier than the results of first instructions; and in such a situation, the execution results of the second instructions can wait in the re-order buffer (113) until the results of first instructions arrive in the re-order buffer (113), such that the results of the first and second instructions can be provided from the re-order buffer (113) according to the program order of the instructions.

At block 135, the re-order buffer (113) outputs the results of the instructions in accordance with the order in which the instructions are programmed.

At block 137, a controller (e.g., 115 or 114) determines whether to adjust the capacity of the re-order buffer (113).

For example, the controller (e.g., 115 or 114) can determine at a regular time interval whether to adjust the capacity of the re-order buffer (113).

For example, the controller (e.g., 115 or 114) can determine whether to adjust the capacity of the re-order buffer (113) when some results can be moved out of the re-order buffer (113) for graduation according to the program order.

For example, the controller (e.g., 115 or 114) can determine whether to adjust the capacity of the re-order buffer (113) when more than a threshold number of results can be moved out of the re-order buffer (113) for graduation according to the program order.

For example, the controller (e.g., 115 or 114) can determine whether to adjust the capacity of the re-order buffer (113) when more than a threshold number of batches of results have been moved out of the re-order buffer (113) for graduation according to the program order.

At block 139, if the controller (e.g., 115 or 114) decides to adjust the capacity of the re-order buffer (113), the controller (e.g., 115 or 114) determines an adjustment to the capacity of the re-order buffer (113) according to an output from a random number generator (116).

For example, the controller (e.g., 115 or 114) can decide to increase or decrease the capacity of the re-order buffer (113) by a random amount calculated based on the output of the random number generator (116).

In some instances, the controller (e.g., 115 or 114) can decide to increase or decrease the capacity of the re-order buffer (113) (e.g., by a predetermined amount) at a randomized time instance controlled by the random number generator (116).

Optionally, the controller (e.g., 115 or 114) can decide to increase or decrease the capacity of the re-order buffer (113) at a random time controlled by a random amount.

At block 141, the controller (e.g., 115 or 114) implements the randomized adjustment to the capacity of the re-order buffer (113).

For example, the controller (e.g., 115 or 114) can adjust the number of dummy results inserted in the re-order buffer (113) to control the useful capacity of the re-order buffer (113) in sorting results.

For example, the controller (e.g., 115 or 114) can adjust the boundaries of the re-order buffer (113) to control the useful capacity of the re-order buffer (113) in sorting results.

For example, the controller (e.g., 115 or 114) can re-partition a set of memory cells configured for multiple re-order buffers (e.g., 113) to adjust their capacities, including the capacity of the re-order buffer (113).

FIG. 4 show a computing system in which the method of FIG. 3 can be implemented.

The computing system of FIG. 4 can include a processor (181) having an internal cache (191), a memory device (187), an external cache (193), and a storage device (189) that is connected to the processor (181) and/or the memory (187) via an interconnect (185).

For example, the processor (181) can have functional units (109) to execute instructions. The processor (181) can further include registers (153) to contain memory addresses, data/operands of instructions to be executed in the functional units (109), and/or execution results of the instructions.

For example, the registers (153) can include a program counter for loading instructions for execution, and a memory address register. When an instruction is being executed in the processor (181), the memory address stored in the memory address register can be used to load an operand of the instruction, and/or store a computing result generated from executing the instruction.

The processor (181) can execute instructions out of their program order and make the results of instructions available in the program order using the re-order buffer (113).

The processor (181) has a controller (151) that is configured to cause randomness in timing of results entering and/or leaving the re-order buffer (113). For example, the randomness can be implemented via randomized adjustments to the useful capacity of the re-order buffer (113), using any of the techniques discussed above in connection with FIGS. 1-3. For example, the controller (151) can be configured as the buffer controller (115) of FIG. 1, or the buffer capacity controller (114) of FIG. 2, to randomize data timing in the re-order buffer (113) using a method of FIG. 3.

The randomizing techniques discussed above can cause the usages of the re-order buffer (113) to be different for each execution of a same program. One of the consequences of the use of the techniques is that for multiple executions of the same program with the same data set under exactly the same computation conditions (same number of users, same amount of physical memory, etc.) the execution time of the program can be different. In many cases, this arrangement by itself can be highly secure against timing attacks.

For example, one of the more publicized security attacks was to determine a cryptographical key, based on timing. When the timing is just one or two cycles different for execution instances, a large body of such attacks can be rendered useless on computer systems having reorder buffers configured in ways discussed in the present disclosure.

For example, the processor (181) can issue instructions to the functional units (109) from the internal cache (191) (e.g., an instruction buffer (103)) when the data/operands of the instruction are available in the internal cache (191), the registers (153), and/or the re-order buffer (113). The processor (181) buffers the execution results of the instructions generated by the functional units (109) for graduation in accordance with the program order of the instructions. The processor (181) can move the results from the re-order buffer (113) in the program order to registers (153), the internal cache (191), the external cache (193), the memory device (187), and/or the storage device (189).

In some instances, the addresses used the registers of the processor (181) are virtual memory addresses; and a memory management unit (MMU) (183) can convert the virtual memory addresses to physical memory addresses to access the external cache (193), the memory device (187), and/or the storage device (189).

For example, the data in the memory device (187) can be cached in the external cache (193) of the processor (181) and/or the internal cache (191) of the processor (181).

For example, the data in the external cache (193) can be cached in the internal cache (191).

For example, the data in the storage device (189) can be cached in the memory device (187), in the external cache (193), and/or in the internal cache (191).

In some instances, the memory management unit (MMU) (183) controls the data movement among the internal cache (191), the external cache (193), and the memory device (187).

The techniques disclosed herein can be applied to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 181) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method, comprising:
    executing, in a processor, instructions of an application according to an order different from an order in which the instructions are programmed;
    buffering, in a re-order buffer of the processor, results of the instructions executed in the processor;

outputting, from the re-order buffer, the results of the instructions in accordance with the order in which the instructions are programmed;

adjusting, by the processor, a capacity of the re-order buffer in buffering the results;

generating a random number to determine the adjusted capacity, wherein the random number is configured to indicate a random fraction of a full capacity of the re-order buffer as a current capacity used to buffer the results; and writing the results from the re-order buffer to registers according to the programmed order of the instructions of the application.

2. The method of claim 1, wherein the capacity of the re-order buffer is adjusted from a predetermined full capacity to a first adjusted capacity, wherein during a time period of operation of the re-order buffer, the first adjusted capacity limits an amount of results bufferable in the re-order buffer.

3. The method of claim 1, further comprising:
operating the re-order buffer at the adjusted capacity during a first period of time;
determining a further adjusted capacity for a second period of time following the first period of time; and
operating the re-order buffer at the further adjusted capacity during the second period of time.

4. The method of claim 3, wherein the second period of time and the first period of time have different lengths.

5. The method of claim 1, further comprising:
fetching the instructions according to the order in which the instructions are programmed;
buffering the instructions in an instruction buffer; and
issuing the instructions to functional units of the processor in accordance with an order in which operands of the instructions become available in the functional units.

6. A processor, comprising:
one or more functional units configured to execute instructions of an application;
a re-order buffer configured to buffer results of the instructions executed in the one or more functional units out of order relative to a programmed order of the instructions of the application;
a controller configured to dynamically adjust a capacity of the re-order buffer, periodically;
registers, wherein the processor is configured to write the results from the re-order buffer to the registers according to the programmed order of the instructions of the application; and
a random number generator, wherein the controller is configured to determine the capacity based on an output of the random number generator;
wherein the output of the random number generator indicates a random fraction of a full capacity of the re-order buffer as a current capacity used to buffer the results.

7. The processor of claim 6, wherein the controller is configured to update the random fraction periodically to control current usage of the re-order buffer.

8. The processor of claim 6, wherein the controller is configured to update the random fraction after a random time period to control current usage of the re-order buffer.

9. The processor of claim 6, wherein the controller is configured to change a timing pattern in results generated by a set of instructions and stored in the re-order buffer by adjusting the capacity usable in re-ordering results.

10. The processor of claim 9, further comprising:
an instruction buffer, wherein the processor is configured to fetch instructions into the instruction buffer in accordance with an order in which the fetched instructions are programmed and issue instructions from the instruction buffer to the one or more functional units in accordance with an order in which operands of instructions in the instruction buffer are ready in the one or more functional units.

11. A non-transitory computer readable medium storing a first set of instructions which, when executed in a processor, cause the processor to perform a method, the method comprising:
executing, in the processor, a second set of instructions of an application according to an order different from an order in which the second set of instructions are programmed;
buffering, in a re-order buffer of the processor, results of the second set of instructions executed in the processor;
outputting, from the re-order buffer, the results of the second set of instructions in accordance with the order in which the second set of instructions are programmed;
adjusting operations of the re-order buffer to introduce randomness in a timing pattern in results that are generated by a set of instructions and stored in the re-order buffer, wherein the adjusting includes changing a current operational capacity of the re-order buffer based on a random number, wherein the current operational capacity is reduced from a full capacity of the re-order buffer to a first adjusted capacity;
generating the random number to determine the first adjusted capacity, wherein the random number is configured to indicate a random fraction of a full capacity of the re-order buffer as a current capacity used to buffer the results of the second set of instructions; and
writing the results from the re-order buffer to registers according to the programmed order of the second set of instructions of the application.

12. The non-transitory computer readable medium of claim 11,
wherein the method further comprises:
determining a random time period during which the re-order buffer is operated at the current operational capacity.

13. The non-transitory computer readable medium of claim 12,
wherein the method further comprises:
fetching the second set of instructions according to the order in which the second set of instructions are programmed;
buffering the second set of instructions in an instruction buffer; and
issuing the second set of instructions to functional units of the processor in accordance with an order in which operands of the second set of instructions become available in the functional units.

* * * * *